(12) United States Patent
Tang et al.

(10) Patent No.: US 12,485,477 B1
(45) Date of Patent: Dec. 2, 2025

(54) COARSE GRAIN CEMENTED CARBIDE AND PREPARATION METHOD THEREOF

(71) Applicant: Chongyi Zhangyuan Tungsten Co., Ltd, Chongyi (CN)

(72) Inventors: Yanyuan Tang, Chongyi (CN); Wei Zhong, Chongyi (CN); Qiumin Yang, Chongyi (CN); Yuan Zhong, Chongyi (CN); Zhiqiang Zhong, Chongyi (CN); Bangming Chen, Chongyi (CN); Bangwen Chen, Chongyi (CN); Haigen Xie, Chongyi (CN); Enbiao Liu, Chongyi (CN)

(73) Assignee: Chongyi Zhangyuan Tungsten Co., Ltd, Chongyi (CN)

( * ) Notice: Subject to any disclaimer, the term of this patent is extended or adjusted under 35 U.S.C. 154(b) by 0 days.

(21) Appl. No.: 18/943,572

(22) Filed: Nov. 11, 2024

(30) Foreign Application Priority Data

Jun. 4, 2024 (CN) .......................... 202410716602.0

(51) Int. Cl.
*B22F 1/05* (2022.01)
*B22F 3/10* (2006.01)
(Continued)

(52) U.S. Cl.
CPC .............. *B22F 1/05* (2022.01); *B22F 3/1007* (2013.01); *B22F 3/105* (2013.01); *C22C 1/051* (2013.01);
(Continued)

(58) Field of Classification Search
CPC ... C22C 29/08; C22C 1/051; B22F 1/05–056; C04B 35/5626
See application file for complete search history.

(56) References Cited

U.S. PATENT DOCUMENTS

| 5,529,804 A * | 6/1996 | Bonneau .................... B22F 1/18 |
| | | 427/217 |
| 6,294,129 B1 * | 9/2001 | Waldenstrom .......... C22C 29/08 |
| | | 419/38 |

(Continued)

FOREIGN PATENT DOCUMENTS

| CN | 109175396 A * | 1/2019 | ............ B22F 1/0018 |
| CN | 110026551 A * | 7/2019 | |

(Continued)

OTHER PUBLICATIONS

Garcia J., "Process development and scale up of cemented carbide production"; Scale-up in Metallurgy (pp. 235-266), Jan. 2010 (Year: 2010).*

(Continued)

*Primary Examiner* — Brian D Walck
*Assistant Examiner* — Austin Pollock

(57) ABSTRACT

The present disclosure relates to the technical field of powder metallurgy, especially to a coarse grain cemented carbide and a preparation method thereof. Pseudo particles in coarse grain tungsten carbide are removed by pretreating process. Broken of the coarse grain tungsten carbide in traditional wet milling is avoid by solid-liquid stirring, spay granulating and surface covering, which also guarantee the uniform distribution of PEG and cobalt salt. Transformation from cobalt salt to cobalt is safely and effectively guaranteed by performing two sintering stages with different atmosphere and temperature to obtain a WC—Co mixture material. By performing spark plasma sintering process, the precipitation of nano fine grain tungsten carbide guarantees regrowth of defect occurred in pretreating process. The coarse grain cemented carbide with the average grain size of WC above 10 μm, the uniform cobalt phase distribution and be bending strength not less than 2200 MPa is prepared.

5 Claims, 1 Drawing Sheet

(51) Int. Cl.
*B22F 3/105* (2006.01)
*C22C 1/051* (2023.01)
*C22C 29/08* (2006.01)

(52) U.S. Cl.
CPC ... *B22F 2003/1051* (2013.01); *B22F 2201/02* (2013.01); *B22F 2302/10* (2013.01); *B22F 2304/10* (2013.01); *C22C 29/08* (2013.01)

(56) References Cited

U.S. PATENT DOCUMENTS 6,887,296 B2 * 5/2005 Mende ............... B22F 9/24
75/365
9,777,349 B2 * 10/2017 Maderud ............... C22C 29/08

FOREIGN PATENT DOCUMENTS

| | | | | |
|---|---|---|---|---|
| CN | 110125438 | A * | 8/2019 | |
| CN | 110387497 | A * | 10/2019 | |
| CN | 112430770 | A | 3/2021 | |
| CN | 113774264 | A * | 12/2021 | ............. C22C 1/051 |
| CN | 113817947 | A | 12/2021 | |
| CN | 113976895 | A * | 1/2022 | |
| CN | 115582539 | A * | 1/2023 | |
| CN | 116479276 | A | 7/2023 | |
| CN | 117051299 | A | 11/2023 | |
| CN | 118291829 | A * | 7/2024 | |
| GB | 1142683 | A | 2/1969 | |
| KR | 20070094301 | A | 9/2007 | |
| WO | WO-2015169132 | A1 * | 11/2015 | ................ B22F 9/08 |

OTHER PUBLICATIONS

Notice of Allowance and Allowed Claims of OEE Application No. CN 202410716602.0.

Notice of First Examination Report of OEE Application No. CN 202410716602.0.

* cited by examiner

COARSE GRAIN CEMENTED CARBIDE AND PREPARATION METHOD THEREOF

CROSS-REFERENCE TO RELATED APPLICATIONS

This application claims priority to Chinese Patent No. 202410716602.0 with a filing date of Jun. 4, 2024. The content of the aforementioned application, including any intervening thereto, is incorporated herein by reference.

TECHNICAL FIELD

This disclosure relates to the technical field of powder metallurgy, especially to a coarse grain cemented carbide and a preparation method thereof.

BACKGROUND OF THE INVENTION

Due to coarse grain of tungsten carbide, coarse cemented carbide has good toughness, heat conductivity, thermal fatigue resistance, dent resistance and abrasion resistance. Extra coarse tungsten carbide powder is used in producing coarse grain cemented carbide, of which average fisher particle size is above 30 μm. However, average grain size of cemented carbide prepared by traditional method is only 4-8 μm, because tungsten carbide grain is broken by traditional wet milling process, which leads to decrease of average grain size of WC, and furthermore there are many pseudo particles like WC aggregates in extra coarse tungsten carbide powder, which will be dispersed to solo WC particles. In order to prevent WC grains from being broken when pursuing high average grain size of WC in cemented carbide, traditional method is decreasing wet milling time. But this method leads to nonuniform distribution of Co phase and decrease of alloy strength. Thus, it results in contradiction between decreasing milling time to ensure coarse grain of WC and increasing milling time to promotion uniform distribution of Co phase, which makes preparation of coarse grain cemented carbide difficult.

SUMMARY OF THE INVENTION

In order to solve the problems in prior art, the main subject of the present disclosure is to provide a coarse grain cemented carbide and a preparation method thereof.

In order to solve the problems mentioned above, according to one aspect of the present disclosure, a following technical solution is provided.

A preparation method of coarse grain cemented carbide contains following steps;
- S1, pretreating a coarse grain tungsten carbide to obtain a pretreated coarse grain tungsten carbide;
- S2, putting a water-soluble cobalt salt, a nano fine grain tungsten carbide and the pretreated coarse grain tungsten carbide in a certain proportion in an agitating vessel; adding deionized water; stirring it to obtain a mixture; spray granulating the mixture to obtain a mixed material;
- S3, putting the mixed material in a mold; sintering it to obtain a coarse grain cemented carbide.

As a preferable embodiment of the preparation method of coarse grain cemented carbide, according to the present disclosure, wherein in the step S1, choosing a coarse grain tungsten carbide with a Fisher particle size above 30 μm to remove pseudo particles; performing dry ball milling process with a ball to material ratio of 1:2, of which time is 60-120 min; sieving the material by a 500-mesh sieve after ball milling; the pretreated coarse grain tungsten carbide is on sieve.

As a preferable embodiment of the preparation method of coarse grain cemented carbide, according to the present disclosure, wherein in the step S2, counting by content of the water-soluble cobalt, a mass ratio of the water-soluble cobalt salt:the nano fine grain tungsten carbide:the pretreated coarse grain tungsten carbide is (5-10):(0.5-1.5):(88.5-94.5).

As a preferable embodiment of the preparation method of coarse grain cemented carbide, according to the present disclosure, wherein in the step S2, adding PEG in the agitating vessel; content of PEG is 3-4% of total weight of water-soluble cobalt salt, nano fine grain tungsten carbide and coarse grain tungsten carbide.

As a preferable embodiment of the preparation method of coarse grain cemented carbide, according to the present disclosure, wherein in the step S2, the water-soluble cobalt salt is at least one of cobalt sulfate, cobalt nitrate and cobalt chloride.

As a preferable embodiment of the preparation method of coarse grain cemented carbide, according to the present disclosure, wherein in the step S2, BET of the nano fine grain tungsten carbide is above 3.5 m$^2$/g.

As a preferable embodiment of the preparation method of coarse grain cemented carbide, according to the present disclosure, wherein in the step S2, spray granulating temperature is 180-250° C.

As a preferable embodiment of the preparation method of coarse grain cemented carbide, according to the present disclosure, wherein in the step S3, the sintering proceeds in stages;
- S31, putting the mold containing the mixed material in a tube furnace for sintering; sintering temperature is 300-450° C.; sintering atmosphere is Nitrogen; sintering time is 120-180 min.
- S32, putting the mold containing the mixed material sintered by S31 in a tube furnace for sintering; sintering temperature is 550-650° C.; sintering atmosphere is Hydrogen; sintering time is 150-240 min.
- S33, putting the mold containing the mixed material sintered by S32 in a spark plasma sintering furnace for sintering; sintering temperature is 1500-1800° C.; sintering pressure is 15-25 MPa; sintering time is 3-8 min.

In order to solve the problems mentioned above, according to another aspect of the present disclosure, a following technical solution is provided.

A coarse grain cemented carbide is prepared by the above-mentioned preparation method of coarse grain cemented carbide.

As a preferable embodiment of the coarse grain cemented carbide, according to the present disclosure, wherein average grain size is above 10 μm; distribution of cobalt phase is uniform; bending strength is not less than 2200 MPa.

The advantages of the present disclosure are as follows.

The present disclosure provides a coarse grain cemented carbide and a preparation method thereof. The pseudo particles in the coarse grain tungsten carbide are removed by the pretreating process. Broken of the coarse grain tungsten carbide in traditional wet milling is avoid by solid-liquid stirring, spay granulating and surface covering, which also guarantee uniform distribution of the PEG and the cobalt salt. Transformation from the cobalt salt to cobalt is safely and effectively guaranteed by performing two sintering stages with different atmosphere and temperature to obtain a WC—Co mixture material. By performing spark plasma sintering process, precipitation of the nano fine grain tungsten carbide guarantees regrowth of defects occurred in the pretreating process. The coarse grain cemented carbide with the average grain size of WC above 10 μm, the uniform cobalt phase distribution and the bending strength not less than 2200 MPa is prepared.

BRIEF DESCRIPTION OF THE DRAWINGS

In order to more clearly illustrate the technical solutions in the present disclosure or prior art, drawings are used in the embodiments or the description of the prior art will be briefly introduced below. It should be understood that, the drawings in the following description are only examples of the present disclosure. For those skilled persons in the art, other drawings can be obtained on these drawings without creative works.

Figure 1:
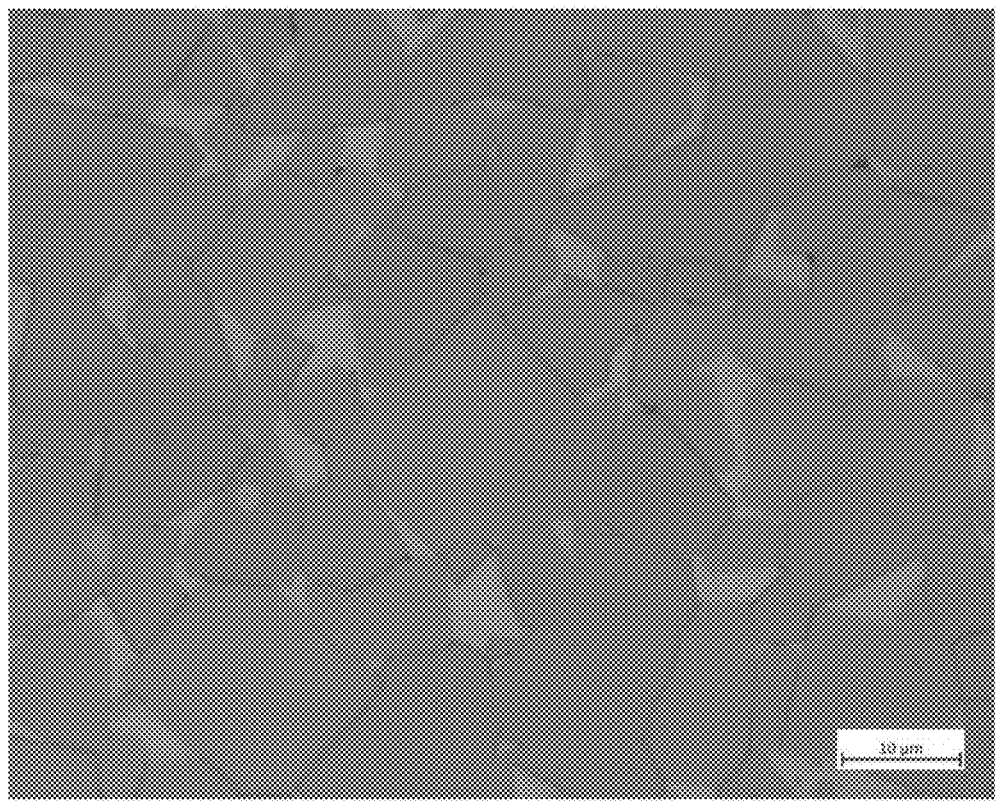
FIG. 1 is a perspective view of the coarse grain cemented carbide prepared by Example 1.

Realization of purpose, functional features and advantages of the present disclosure will be further illustrated in conjunction with embodiments and with reference to the accompanying drawings

DETAILED DESCRIPTION OF THE INVENTION

A clear and complete description is made below in conjunction with the technical solutions in the embodiments. Apparently, the described embodiments are only some of the embodiments of the present disclosure, but not all of them. Based on the embodiments of the present disclosure, all other embodiments obtained by persons of ordinary skilled in the art without creative efforts fall within the scale of claims in the present disclosure.

The advantages of the coarse grain cemented carbide and the preparation method thereof provided by the present disclosure are as follows;
  (1) The pretreated coarse grain tungsten carbide is pretreated to remove the pseudo particles, which reduces existence of fine grain WC and makes WC grain in the coarse grain cemented carbide more uniform.
  (2) The solid-liquid stirring, spay granulating and surface covering processes are performed to avoid the broken of the coarse grain tungsten carbide in traditional wet milling, which also guarantees the uniform distribution of PEG and cobalt salt.
  (3) The two sintering stages with different atmosphere and temperature are performed to obtain a WC—Co mixture material, which safely and effectively guarantees the transformation from cobalt salt to cobalt.
  (4) The spark plasma sintering process is performed. Precipitation of nano fine grain tungsten carbide guarantees regrowth of defects occurred in pretreating process. Therefore, the coarse grain cemented carbide with the average grain size of WC above 10 μm, the uniform cobalt phase distribution and the bending strength not less than 2200 MPa is prepared.

According to one aspect of the present disclosure, the following technical solution is provided.

A preparation method of coarse grain cemented carbide contains following steps;
  S1, pretreating a coarse grain tungsten carbide to obtain a pretreated coarse grain tungsten carbide;
  S2, putting a water-soluble cobalt salt, a nano fine grain tungsten carbide and the pretreated coarse grain tungsten carbide in a certain proportion in an agitating vessel; adding deionized water; stirring it to obtain a mixture; spray granulating the mixture to obtain a mixed material;
  S3, putting the mixed material in a mold; sintering it to obtain a coarse grain cemented carbide.

The solid-liquid stirring, spay granulating and surface covering processes are performed in the present disclosure. A cover of the water-soluble cobalt salt is formed on the surface of the tungsten carbide after spay granulating. A tungsten carbide covered with cobalt was formed by reducing process. As a result, the broken of the coarse grain tungsten carbide in traditional wet milling is avoid. The uniform distribution of PEG and cobalt salt is also guaranteed.

Furthermore, in the step S1, choosing a coarse grain tungsten carbide with a Fisher particle size above 30 μm to remove pseudo particles; performing dry ball milling process with a ball to material ratio of 1:2, of which time is 60-120 min; sieving the material by a 500-mesh sieve after ball milling; the pretreated coarse grain tungsten carbide is on sieve.

Furthermore, in the step S2, counting by content of the water-soluble cobalt, a mass ratio of the water-soluble cobalt salt:the nano fine grain tungsten carbide:the pretreated coarse grain tungsten carbide is (5-10):(0.5-1.5):(88.5-94.5).

Furthermore, in the step S2, adding PEG in the agitating vessel; content of PEG is 3-4% of total weight of water-soluble cobalt salt, nano fine grain tungsten carbide and coarse grain tungsten carbide.

Furthermore, in the step S2, the water-soluble cobalt salt is at least one of cobalt sulfate, cobalt nitrate and cobalt chloride.

Furthermore, in the step S2, BET of the nano fine grain tungsten carbide is above 3.5 $m^2/g$.

Furthermore, in the step S2, spray granulating temperature is 180-250° C.

Furthermore, in the step S3, the sintering proceeds in stages;
  S31, putting the mold containing the mixed material in a tube furnace for sintering; sintering temperature is 300-450° C.; sintering atmosphere is Nitrogen; sintering time is 120-180 min.
  S32, putting the mold containing the mixed material sintered by S31 in a tube furnace for sintering; sintering temperature is 550-650° C.; sintering atmosphere is Hydrogen; sintering time is 150-240 min.
  S33, putting the mold containing the mixed material sintered by S32 in a spark plasma sintering furnace for sintering; sintering temperature is 1500-1800° C.; sintering pressure is 15-25 MPa; sintering time is 3-8 min.

The two sintering stages with different atmosphere and temperature are performed in the present disclosure to obtain a WC—Co mixture material, which safely and effectively guarantees the transformation from cobalt salt to cobalt. The spark plasma sintering process is performed. The precipitation of nano fine grain tungsten carbide guarantees regrowth of defect occurred in pretreating process.

According to another aspect of the present disclosure, a following technical solution is provided.

A coarse grain cemented carbide is prepared by the above-mentioned preparation method of coarse grain cemented carbide. The average grain size of the coarse grain cemented carbide is above 10 μm. The distribution of cobalt phase in the coarse grain cemented carbide is uniform. The bending strength of the coarse grain cemented carbide is not less than 2200 MPa.

Further illustration about the technical solutions of the present disclosure is showed according to examples.

Example 1

A preparation method of coarse grain cemented carbide contains following steps;

- S1, a coarse grain tungsten carbide was pretreated to obtain a pretreated coarse grain tungsten carbide. A coarse grain tungsten carbide with a Fisher particle size of 32.30 μm was chosen to remove pseudo particles. Dry ball milling with a ball/material ratio of 1:2 was performed. Ball milling time was 60 min. Sieving process was performed by a 500-mesh sieve after ball milling to obtain a pretreated coarse grain tungsten carbide which was on the sieve.
- S2, a cobalt nitrate, a nano fine grain tungsten carbide and the pretreated coarse grain tungsten carbide in a certain proportion was put in an agitating vessel. Deionized water was added. Stirring process was performed to obtain a mixture. And then the mixture was spray granulated to obtain a mixed material. Counting by content of the cobalt nitrate, a mass ratio of the cobalt nitrate:the nano fine grain tungsten carbide:the coarse grain tungsten carbide was 5:1.5:93.5. PEG was also added in the agitating vessel, of which content was 3.5% of total weight of the cobalt nitrate, the nano fine grain tungsten carbide and the coarse grain tungsten carbide. BET of the nano fine grain tungsten carbide was 3.85 $m^2/g$. Spay granulating temperature was 230° C.
- S3, the mixed material was put in a mold. Sintering process was performed to obtain a coarse grain cemented carbide. The sintering proceeded in stages.
- S31, the mold containing the mixed material was put in a tube furnace for sintering. Sintering temperature was 450° C. Sintering atmosphere of the was Nitrogen. Sintering time was 180 min.
- S32, the mold containing the mixed material sintered by S31 was put in a tube furnace for sintering. Sintering temperature was 550° C. Sintering atmosphere of the was Hydrogen. Sintering time was 180 min.
- S33, the mold containing the mixed material sintered by S32 was put in a spark plasma sintering furnace for sintering. Sintering temperature was 1630° C. Sintering pressure was 20 MPa. Sintering time was 6 min.

The perspective view of the coarse grain cemented carbide prepared by this example was shown in FIG. 1. The average grain size of the coarse grain cemented carbide was 10.65 μm. The distribution of cobalt was uniform. The bending strength of the coarse grain cemented carbide was 2318 MPa.

Example 2

A preparation method of coarse grain cemented carbide contains following steps;

- S1, a coarse grain tungsten carbide was pretreated to obtain a pretreated coarse grain tungsten carbide. A coarse grain tungsten carbide with a Fisher particle size of 34.10 μm was chosen to remove pseudo particles. Dry ball milling with a ball/material ratio of 1:2 was performed. Ball milling time was 60 min. Sieving process was performed by a 325-mesh sieve after ball milling to obtain a pretreated coarse grain tungsten carbide which was on the sieve.
- S2, a cobalt nitrate, a nano fine grain tungsten carbide and the pretreated coarse grain tungsten carbide in a certain proportion was put in an agitating vessel. Deionized water was added. Stirring process was performed to obtain a mixture. And then the mixture was spray granulated to obtain a mixed material. Counting by content of the cobalt nitrate, a mass ratio of the cobalt nitrate:the nano fine grain tungsten carbide:the coarse grain tungsten carbide was 10:0.5:89.5. PEG was also added in the agitating vessel, of which content was 4% of total weight of the cobalt nitrate, the nano fine grain tungsten carbide and the coarse grain tungsten carbide. BET of the nano fine grain tungsten carbide was 3.65 $m^2/g$. Spay granulating temperature was 210° C.
- S3, the mixed material was put in a mold. Sintering process was performed to obtain a coarse grain cemented carbide. The sintering proceeded in stages.
- S31, the mold containing the mixed material was put in a tube furnace for sintering. Sintering temperature was 420° C. Sintering atmosphere of the was Nitrogen. Sintering time was 180 min.
- S32, the mold containing the mixed material sintered by S31 was put in a tube furnace for sintering. Sintering temperature was 550° C. Sintering atmosphere of the was Hydrogen. Sintering time was 150 min.
- S33, the mold containing the mixed material sintered by S32 was put in a spark plasma sintering furnace for sintering. Sintering temperature was 1550° C. Sintering pressure was 15 MPa. Sintering time was 8 min.

The average grain size of the coarse grain cemented carbide prepared by this example was 10.84 μm. The distribution of cobalt was uniform. The bending strength of the coarse grain cemented carbide was 2261 MPa.

Example 3

A preparation method of coarse grain cemented carbide contains following steps;

- S1, a coarse grain tungsten carbide was pretreated to obtain a pretreated coarse grain tungsten carbide. A coarse grain tungsten carbide with a Fisher particle size of 35.75 μm was chosen to remove pseudo particles. Dry ball milling with a ball/material ratio of 1:2 was performed. Ball milling time was 60 min. Sieving process was performed by a 325-mesh sieve after ball milling to obtain a pretreated coarse grain tungsten carbide which was on the sieve.
- S2, a cobalt nitrate, a nano fine grain tungsten carbide and the pretreated coarse grain tungsten carbide in a certain proportion was put in an agitating vessel. Deionized water was added. Stirring process was performed to obtain a mixture. And then the mixture was spray granulated to obtain a mixed material. Counting by content of the cobalt nitrate, a mass ratio of the cobalt nitrate:the nano fine grain tungsten carbide:the coarse grain tungsten carbide was 8:1.2:90.8. PEG was also added in the agitating vessel, of which content was 3% of total weight of the cobalt nitrate, the nano fine grain tungsten carbide and the coarse grain tungsten carbide. BET of the nano fine grain tungsten carbide was 4.03 $m^2/g$. Spay granulating temperature was 190° C.
- S3, the mixed material was put in a mold. Sintering process was performed to obtain a coarse grain cemented carbide. The sintering proceeded in stages.
- S31, the mold containing the mixed material was put in a tube furnace for sintering. Sintering temperature was 400° C. Sintering atmosphere of the was Nitrogen. Sintering time was 180 min.

S32, the mold containing the mixed material sintered by S31 was put in a tube furnace for sintering. Sintering temperature was 650° C. Sintering atmosphere of the was Hydrogen. Sintering time was 150 min.

S33, the mold containing the mixed material sintered by S32 was put in a spark plasma sintering furnace for sintering. Sintering temperature was 1750° C. Sintering pressure was 20 MPa. Sintering time was 3 min.

The average grain size of the coarse grain cemented carbide prepared by this example was 11.4 μm. The distribution of cobalt was uniform. The bending strength of the coarse grain cemented carbide was 2293 MPa.

Comparative Example 1

The differences between this comparative example and example 1 were as follows. The cemented carbide was prepared by traditional method which included wet milling, spay granulating and press sintering. The ratio of WC to Co was 1:5.

The average grain size of the coarse grain cemented carbide prepared by this comparative example was 7.52 μm. The distribution of cobalt was nonuniform. The bending strength of the coarse grain cemented carbide was 1826 MPa.

Comparative Example 2

The difference between this comparative example and example 1 that the Step S1 was not performed in this comparative example.

Figure 2:
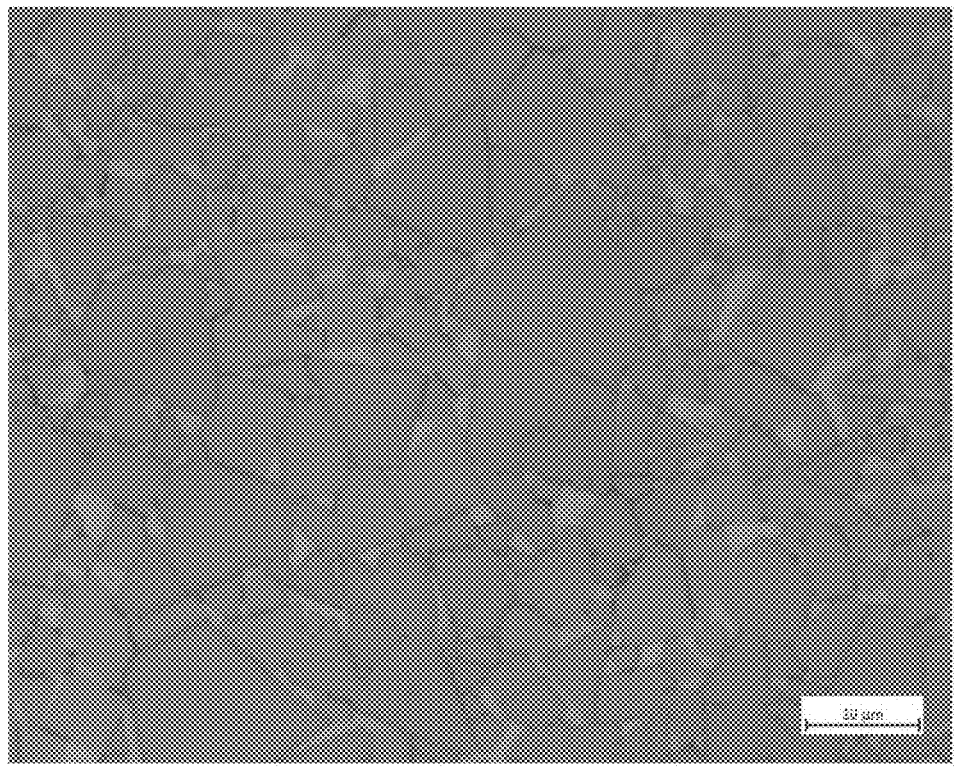
FIG. 2 is a perspective view of the coarse grain cemented carbide prepared by Comparative Example 2.

The perspective view of the coarse grain cemented carbide prepared by this comparative example was shown in FIG. 2. The average grain size of the coarse grain cemented carbide was 7.84 μm. The distribution of cobalt was uniform. The bending strength of the coarse grain cemented carbide was 1771 MPa.

Comparative Example 3

The difference between this comparative example and example 1 that counting by content of the cobalt nitrate, the mass ratio of the cobalt nitrate:the nano fine grain tungsten carbide:the coarse grain tungsten carbide was 5:3:93.5.

The average grain size of the coarse grain cemented carbide prepared by this comparative example was 9.21 μm. The distribution of cobalt was uniform. The bending strength of the coarse grain cemented carbide was 2016 MPa.

Comparative Example 4

The difference between this comparative example and example 1 that the Step S31 was not performed in this comparative example.

Blasting was occurred in the step S3. The coarse grain cemented carbide was not prepared.

Comparative Example 5

The difference between this comparative example and example 1 that the Step S32 was not performed in this comparative example.

The decarburization of the coarse grain cemented carbide prepared by this comparative example was serious.

Comparative Example 6

The difference between this comparative example and example 1 that the Step S31 and S32 were not performed in this comparative example.

Many pores were in the coarse grain cemented carbide prepared by this comparative example was serious. The cemented carbide was not compact.

As shown in above-mentioned examples and comparative example, the coarse grain tungsten carbide was pretreated to remove the pseudo particles, which reduced existence of the fine grain WC and made the WC grain in the coarse grain cemented carbide more uniform. The solid-liquid stirring, the spay granulating and the surface covering process were performed to avoid the broken of the coarse grain tungsten carbide in traditional wet milling. It also guaranteed the uniform distribution of PEG and cobalt salt. The two sintering stages with different atmosphere and temperature were performed to obtain the WC—Co mixture material, which safely and effectively guaranteed the transformation from cobalt salt to cobalt. The spark plasma sintering process was performed. The precipitation of nano fine grain tungsten carbide guaranteed the regrowth of defect occurred in pretreating process. Therefore, the coarse grain cemented carbide with the average grain size of WC above 10 μm, the uniform cobalt phase distribution and the bending strength not less than 2200 MPa was prepared.

The descriptions mentioned above are only some preferred embodiments of the present disclosure, which doesn't limit the claim scale of the present disclosure. The claim scale of the present disclosure contains any changes with same effects, direct or indirect application in other field according to the solutions of the present disclosure.

What is claimed is:

1. A preparation method of grain cemented carbide, characterized in that comprising following steps;

S1, pretreating coarse grain tungsten carbide with a Fisher particle size above 30 μm; performing a dry ball milling process with a ball to material ratio of 1:2, of which time is 60-120 min; sieving the material by a 325-mesh sieve after ball milling; the pretreated coarse grain tungsten carbide is on sieve;

S2, putting a water-soluble cobalt salt, a nano fine grain tungsten carbide and the pretreated coarse grain tungsten carbide in a certain proportion in an agitating vessel; adding deionized water; stirring it to obtain a mixture; spray granulating the mixture to obtain a mixed material; wherein the mass ratio of the water-soluble cobalt salt, the nano fine grain tungsten carbide, and the coarse grain tungsten carbide is (5-10):(0.5-1.5):(88.5-94.5), with the amount of cobalt salt calculated on the basis of cobalt content;

S3, putting the mixed material in a mold; sintering it; the sintering proceeds in stages; S31, putting the mold containing the mixed material in a tube furnace for sintering; sintering temperature is 300-450° C.; sintering atmosphere is nitrogen; sintering time is 120-180 min; S32, putting the mold containing the mixed material sintered by S31 in the tube furnace for sintering; sintering temperature is 550-650° C.; sintering atmosphere is hydrogen; sintering time is 150-240 min; S33, putting the mold containing the mixed material sintered by S32 in a spark plasma sintering furnace for sintering; sintering temperature is 1500-1800° C.; sintering pressure is 15-25 MPa; sintering time is 3-8 min to obtain the cemented carbide.

2. The preparation method of cemented carbide according to claim 1, characterized in that, in the step S2, adding PEG (polyethylene glycol) in the agitating vessel; content of PEG is 3-4% of total weight of water-soluble cobalt salt, nano fine grain tungsten carbide and coarse grain tungsten carbide.

3. The preparation method of cemented carbide according to claim 1, characterized in that, in the step S2, the water-soluble cobalt salt is at least one of cobalt sulfate, cobalt nitrate and cobalt chloride.

4. The preparation method of cemented carbide according to claim 1, characterized in that, in the step S2, BET of the nano fine grain tungsten carbide is above 3.5 m$^2$/g.

5. The preparation method of cemented carbide according to claim 1, characterized in that, in the step S2, spray granulating temperature is 180-250° C.

* * * * *